United States Patent [19]

Hall

[11] 4,116,343
[45] Sep. 26, 1978

[54] STORAGE RACK

[75] Inventor: Lee Z. Hall, Detroit, Mich.

[73] Assignee: Palmer-Shile Company, Detroit, Mich.

[21] Appl. No.: 825,567

[22] Filed: Aug. 18, 1977

[51] Int. Cl.² ............................................. A47F 3/06
[52] U.S. Cl. .................................... 211/151; 211/191
[58] Field of Search ............................. 211/151, 191; 214/16.4 R, 16.4 C; 108/102

[56] References Cited

U.S. PATENT DOCUMENTS

| | | | |
|---|---|---|---|
| 458,902 | 9/1891 | Hine | 211/151 |
| 2,769,559 | 11/1956 | Johnson | 211/151 X |
| 3,044,633 | 7/1962 | Baker | 211/191 |
| 3,465,897 | 9/1969 | Schumann | 211/151 |

*Primary Examiner*—Roy D. Frazier
*Assistant Examiner*—Robert W. Gibson, Jr.
*Attorney, Agent, or Firm*—Harness, Dickey & Pierce

[57] ABSTRACT

An industrial storage rack construction which receives cassettes, that is, elongated racks for heavy materials, in vertically arranged relationship. The cassettes are to be inserted in and retrieved from the rack, and the invention pertains to the means for supporting the cassettes. This means comprises a series of rollers from front to rear of the rack at each level, supported by anti-friction bearings, and a rigid bar with a convex upper surface across the rear of the rack. The top of this bar is at a level slightly above the leve of the rollers. Each cassette is constructed with lower rails which ride on the rollers when the cassette is being inserted. The rearward ends of these rails will ride up on the rigid bar as insertion is completed so that the cassette will be frictionally locked in place while still being retrievable by the exertion of a relatively small withdrawing force. The friction lock will prevent creeping of the cassette out of its bay, and in case of seismic shocks the storage rack will tend to shift under the loaded cassettes, minimizing stresses on the storage rack itself.

2 Claims, 11 Drawing Figures

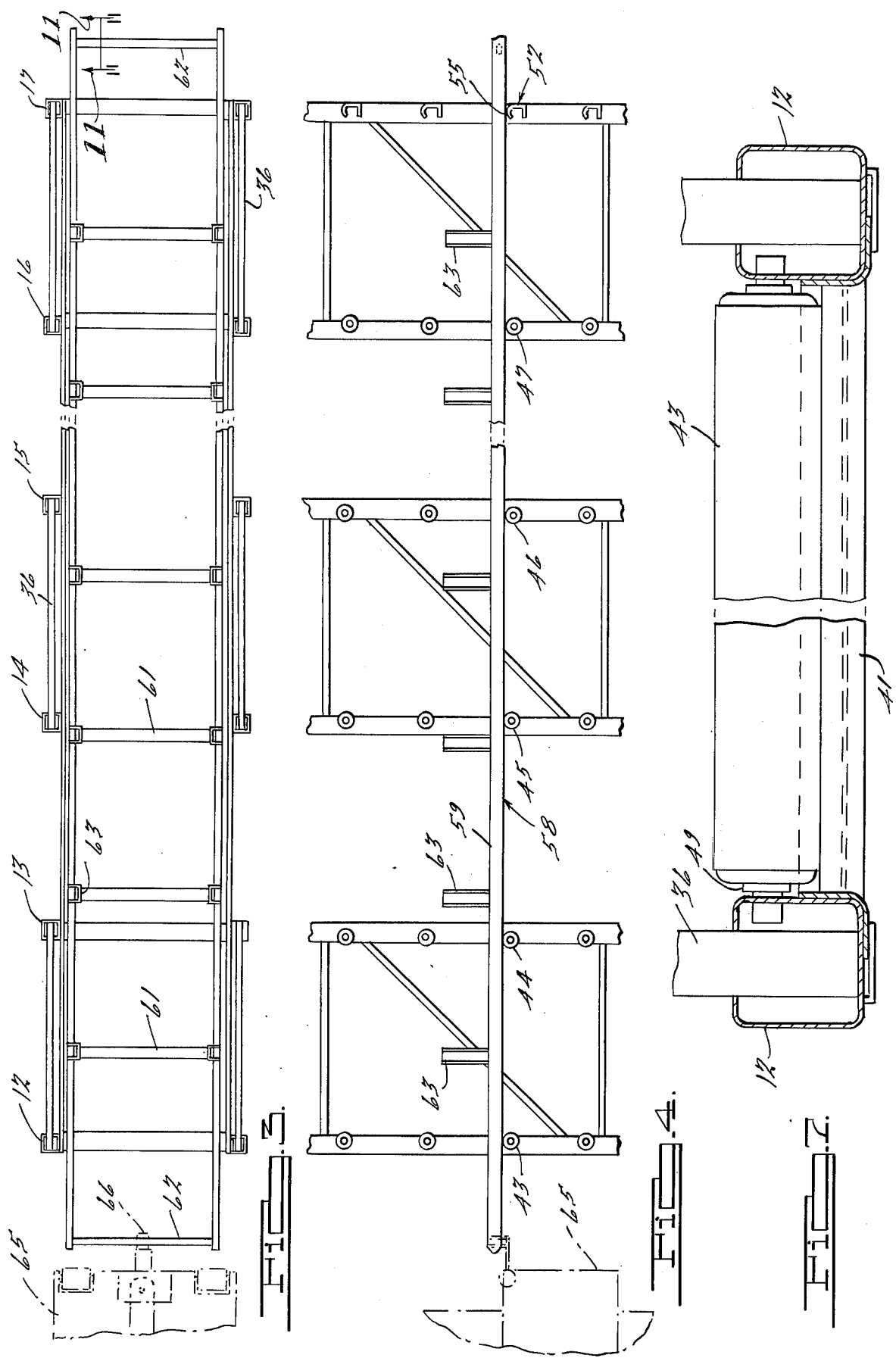

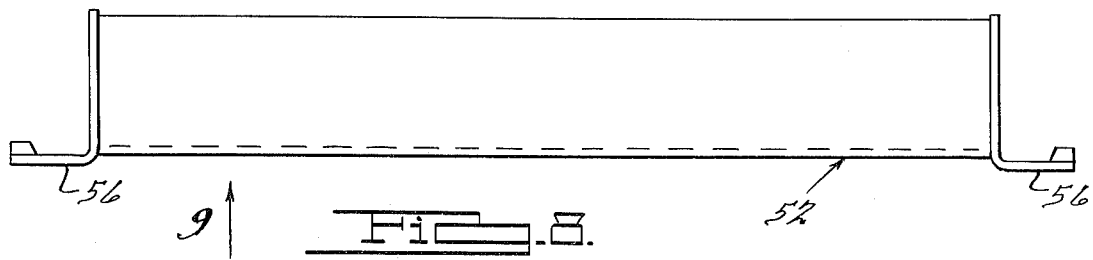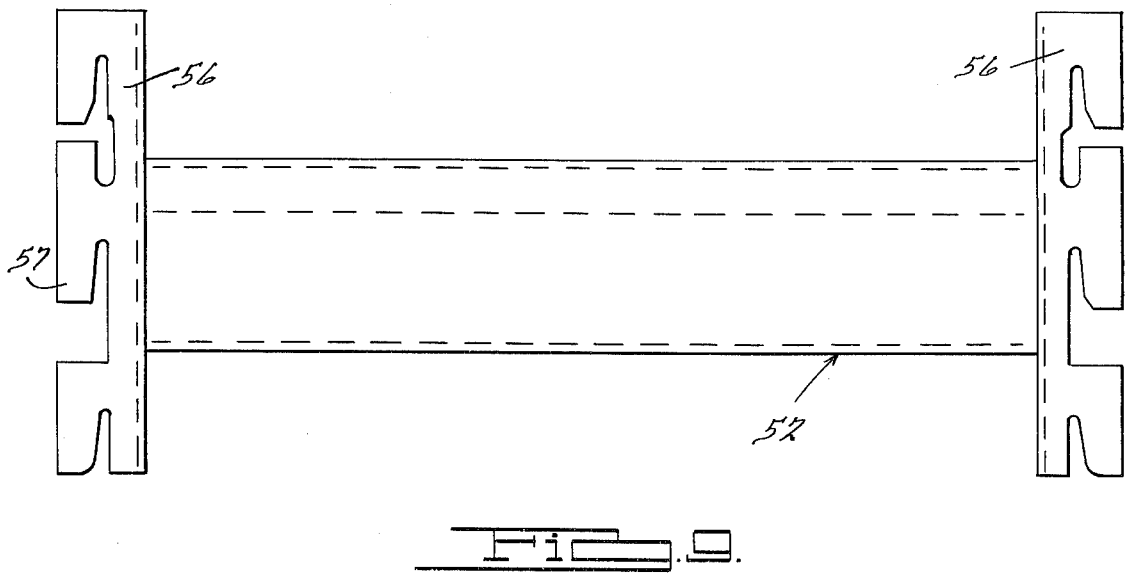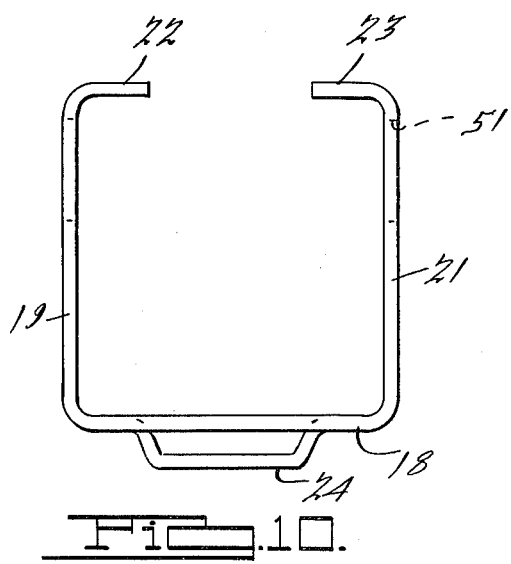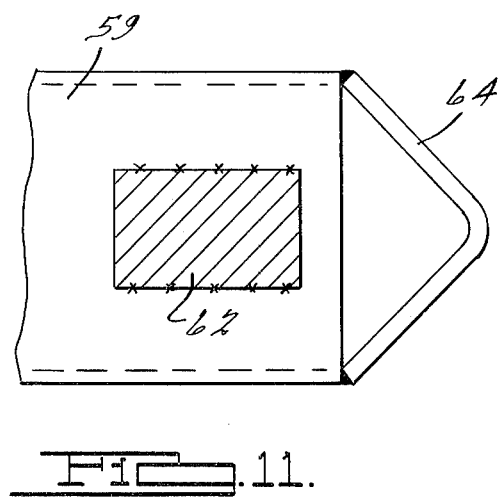

STORAGE RACK

BACKGROUND OF THE INVENTION

1. Field of the Invention

The invention relates to industrial storage racks, and particularly racks in which elongated cassettes containing stock such as bars or pipes are inserted in and retrieved from various vertically arranged openings.

2. Description of the Prior Art

One of the concerns in such industrial storage racks is the possibility of incremental slight movement, or "creeping" of the cassettes with respect to the openings as a result of vibrations which occur from time to time. Another potential problem is the possibility of an earthquake or other seismic shock. Since the loads in the cassettes are so great, non-yielding connections between the cassettes and the rack would result in high stresses being inserted on the storage rack structure due to swaying of the loads. This would require the provision of relatively heavy metal sections in the design of the storage rack to withstand such potential forces, greatly increasing the costs of construction.

One of the conventional ways of preventing the creeping action has been to provide mechanical locks at the openings which would retain the cassettes in position. This of course requires a great deal of expense especially where a large number of openings are involved. Another solution attempted in the past has been to provide the rollers in each opening, on which the cassettes are moved in and out, with plain or friction bearings rather than anti-friction bearings. While this reduces the creeping tendency of the cassette, it also greatly increases the required force to insert or retrieve each cassette.

BRIEF SUMMARY OF THE INVENTION

It is the object of the present invention to provide a storage rack construction which overcomes the drawbacks of the above described constructions and prevents creeping of the cassette in the opening while still not imposing an inordinate force requirement on the insertion and retrieval means for the cassette.

It is a further object to provide a storage rack construction of this nature which will accommodate seismic shocks without imposing excessive stresses on the storage rack, thus eliminating the need for heavy and expensive rack sections.

It is also an object to provide an improved storage rack construction of this character which is compatible with existing rack constructions and requires a minimum of additional or expensive equipment.

Briefly, the invention comprises a storage rack having a plurality of elongated front to rear openings in vertically arranged relation, a plurality of cassettes insertable in said openings, each cassette comprising an elongated frame with a pair of bottom rails, each opening having a series of transverse rollers, said series extending from front to rear, each roller being supported on anti-friction bearings, and a locking beam extending across the rear of each opening, said locking beam having a convex upper surface the highest point of which is slightly above the level of said rollers, the rearward end of each cassette being so shaped as to be engageable with said locking beam as the cassette is inserted whereby it will ride up onto the locking beam to create a frictional locking force between the locking beam and cassette.

BRIEF DESCRIPTION OF THE DRAWINGS

FIG. 3 is a top plan view of one of the openings showing the cassette inserted therein as well as the series of rollers and the locking beam;

FIG. 4 is a side elevational view of the opening with the cassette therein, parts being omitted for clarity;

FIG. 7 is a cross sectional plan view taken along the line 7—7 of FIG. 5 and showing the mounting of a tie beam on the posts near the adjacent roller;

FIG. 8 is a top plan view of one of the locking beams;

FIG. 9 is a rear elevational view thereof taken in the direction of the arrow 9 of FIG. 8;

FIG. 10 is a plan view of a post showing the cross sectional shape thereof and the louvers for receiving the connecting members of the tie beams and locking beams; and FIG. 11 is an enlarged fragmentary cross sectional view in elevation taken along the line 11—11 of FIG. 3 of the rearward end of a cassette base rail showing the end guide.

DESCRIPTION OF THE PREFERRED EMBODIMENT

Figures 1, 2:
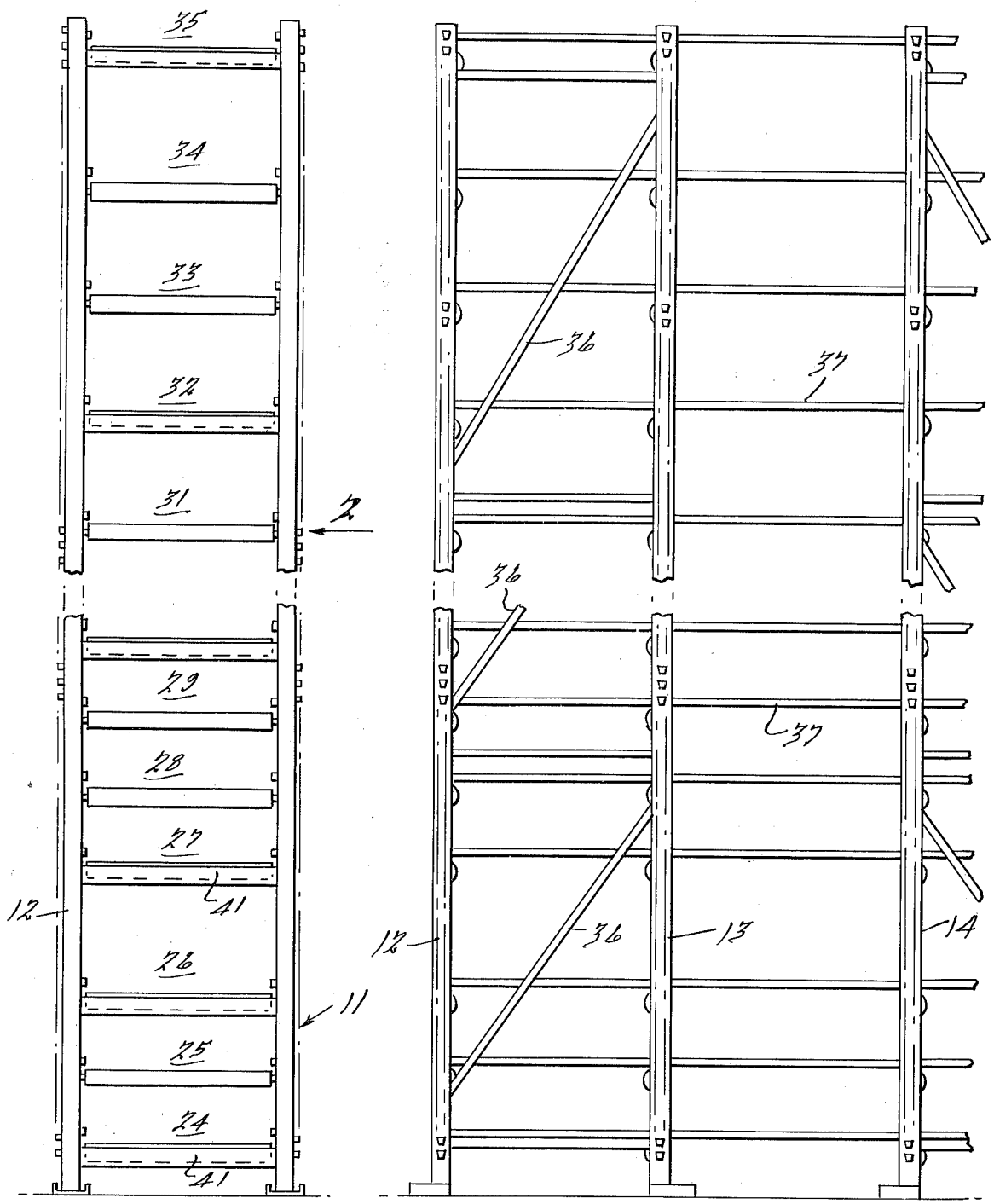
FIG. 1 is a front view of a typical bay of the storage rack showing the vertically arranged openings.
FIG. 2 is a side elevational view of the forward portion of the bay taken in the direction of the arrow 2 of FIG. 1, parts being broken away for clarity.
Figure 5:
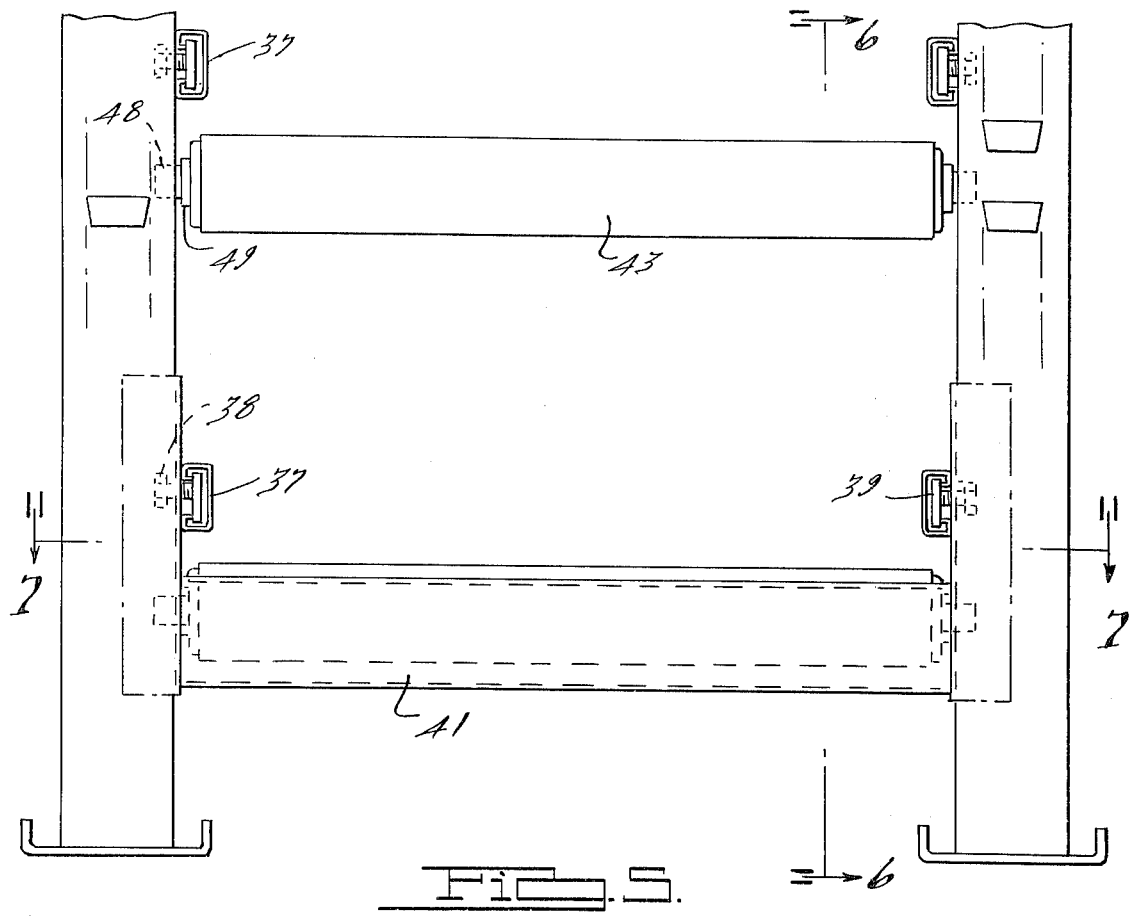
FIG. 5 is a front elevational view of the lower portion of the bay showing the rub rails, rollers and a tie beam.

A bay of the industrial storage rack is indicated generally at 11 of FIG. 1. The bay has a pair of front posts 12 and a series of intermediate posts 13 through 16, as well as a pair of rear posts 17. Adjacent bays (not shown) on one or both sides of bay 11 would have posts which are common with those of bay 11. As shown, the posts have cross-sectional shapes as shown in FIG. 10, being box-like with a central web 18, side flanges 19 and 21, and end flanges 22 and 23. A series of louvers 24 is formed in web 18 for the reception of the teeth on connecting members to be described later. This mounting system is as shown and described in Baker U.S. Pat. No. 3,044,633 issued July 17, 1962 for Adjustable Storage Rack. Since the slotted post construction and interlocking connecting members do not in and of themselves form part of the present invention, they are not shown in detail except in certain views of the present application, and reference is made to the aforesaid patent for a fuller understanding of the manner in which this vertically adjustable mounting system works.

Each bay 11 has a plurality of openings, some of these openings being indicated at 24 through 29 and 31 through 35. The openings are vertically arranged but will vary in height to take different sizes of loads or cassettes.

The first and second posts 12 and 13 of each bay are connected by diagonal braces 36, as are the third and fourth posts and the fifth and sixth posts. All the posts in each row are connected by rub rails 37 which are bolted to the insides of the posts along intermediate portions of the openings by bolts 38 and nuts 39 disposed within the channel shaped rub rails.

Figure 6:
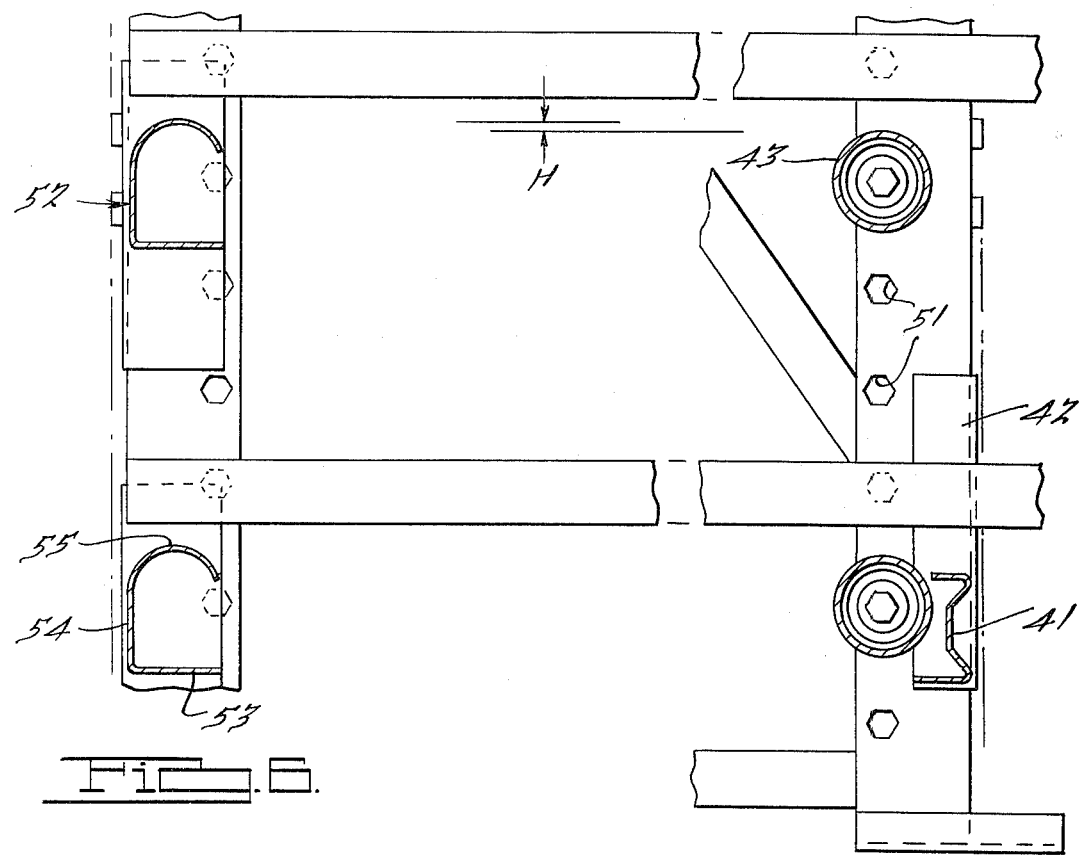
FIG. 6 is a cross sectional and elevational view taken along the line 6—6 of FIG. 5 but showing only the rearward portion of the opening with the locking beam.

Tie beams 41 are provided to connect the forward pair of posts 12 immediately below the level of certain openings thereof. The cross-sectional shape of a tie beam 41 is shown in FIG. 6, the beams being connected to the posts by L-shaped connecting members 42 having the aforementioned teeth which fit in slots or louvers 24 on the posts.

The bed of each opening is formed by a series of rollers 43 through 47 extending from front to rear of the opening as seen in FIG. 4. These rollers are mounted on shafts 48 by anti-friction rollers 49, the shafts being mounted in non-circular openings 51 in the post flanges 19 and 21. As noted in FIG. 6, the level of the rollers in each opening is slightly above that of tie beam 41.

Instead of a roller interconnecting the rearward pair of posts 17, a locking beam indicated generally at 52 is provided. The construction of the locking beam is seen in FIGS. 6, 8 and 9. The beam comprises a lower horizontal flange 53, a vertical web 54 extending upwardly from the rearward edge of flange 53, and an upwardly facing convex upper flange 55 extending from the upper portion of web 54. A pair of L-shaped connecting members 56 are secured to the opposite ends of beam 52 and have teeth 57 receivable by slots or louvers 24 of posts 17. When in position, the upper convex portions 55 of beams 52 will present an upwardly and rearwardly inclined surface to the rails of an advancing cassette as will be later described. The apex of convex surface 55 is positioned slightly higher than the upper surfaces of rollers 43 in the corresponding opening. This distance is indicated by the gap H in FIG. 6 and may be for example ¼ inch in a typical installation.

A cassette for use in this system is indicated generally at 58 and is shown best in FIGS. 3 and 4. The cassette is somewhat longer than the distance from forwardmost roller 43 to locking beam 52 of an opening. The cassette comprises a base having a pair of rails 59 of hollow rectangular shape with a series of intermediate cross members 61 and end cross members 62 connecting the rails. A plurality of side posts 63 are secured to the upper surfaces of the rails and extend upwardly therefrom to contain the load which may consist of bars, tubes or similar elongated members. As seen in FIG. 11, end guides 64 in the form of V-shaped members are welded to opposite ends of the rails 59. These will enable the rails to ride up on locking members 52.

In operation, cassettes 58 will be inserted into and removed from the openings by any appropriate means such as an automatic stacker indicated partially in dot-dash lines at 65 in FIGS. 3 and 4. Such a stacker has a portion 66 engageable with the forward cross-member 62 of a cassette 58. The stacker may carry a cassette by combined horizontal and vertical movement across the face of the storage rack, to a proper opening in one of the bays of the rack and insert the cassette by feeding it from left to right in FIGS. 3 and 4 until it reaches its final position as shown in those figures.

As the cassette is inserted into the opening it will ride successively onto rollers 43 to 47. When it reaches locking beam 52, end guides 64 will ride up onto the locking beam and portions of rails 59 will come to rest thereon. Since the locking beam is slightly higher than rollers 43 through 47 there will be some slight deflection of rails 59, with frictional force being created between the rails and the locking beam. The amount of deflection will depend on the degree of loading of the cassette. In the case of a fully loaded cassette the deflection could be sufficient so that the rails touch all the rollers 43 through 47 as well as the locking beam. If the cassette is unloaded, roller 47 and possibly 46 would not be contacted by the rails.

In any event, the frictional locking created by contact of the rails with beam 52 will prevent "creeping" or front to rear movement of the cassette with respect to the rack which would otherwise occur due to vibration and jarring. When it is desired to remove the cassette from the opening, the force which the stacker portion 66 must exert on the cassette will not be excessive because most of the weight of the cassette will rest on rollers 43 through 47. After the initial movement which withdraws the rearward end of the cassette from contact with beam 52, the force necessary to completely withdraw the cassette will be even less.

In case of seismic shock due to an earthquake or the like, bay 11 could move back and forth with respect to loaded cassettes 58 which would have much more inertia. Although some misalignment of the cassettes with respect to the bay may occur, the fact that the cassettes are not firmly held to the bay will mean that substantially less stress would be imposed on the rack components than would otherwise be the case. The storage rack bays may thus be constructed of lighter material than would be needed if the parts had to withstand the high forces imposed by the loaded cassettes.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

I claim:

1. A storage rack comprising a plurality of elongated front to rear openings in vertically arranged relation, a plurality of cassettes insertable in said openings, each cassette comprising an elongated frame with a pair of bottom rails, each opening having a series of transverse rollers, said series extending from front to rear, each roller being supported on anti-friction bearings, and a locking beam extending across the rear of each opening, said locking beam having a convex upper surface the highest point of which is slightly above the level of said rollers, the rearward end of each cassette having means engageable with said said locking beam as the cassette is inserted to cause said cassette to ride up onto the locking beam to create a frictional locking force between the locking beam and cassette.

2. The combination according to claim 1, said rack comprising a series of front posts, rear posts and intermediate posts, said rollers extending between adjacent said front posts and adjacent intermediate posts, said locking beam extending between said rear posts and being detachably connected thereto.

* * * * *

UNITED STATES PATENT AND TRADEMARK OFFICE
CERTIFICATE OF CORRECTION

PATENT NO. : 4,116,343
DATED : September 26, 1978
INVENTOR(S) : Lee Z. Hall

It is certified that error appears in the above-identified patent and that said Letters Patent are hereby corrected as shown below:

Abstract, line 10, "leve" should be -- level--;

Column 3, line 36, "imtermediate" should be -- intermediate --;

Column 4, line 51, "said said" should be -- said --.

Signed and Sealed this

Fifteenth Day of May 1979

[SEAL]

Attest:

RUTH C. MASON
Attesting Officer

DONALD W. BANNER
Commissioner of Patents and Trademarks